United States Patent
Ritchie et al.

(10) Patent No.: US 6,533,967 B1
(45) Date of Patent: Mar. 18, 2003

(54) INITIATING SYSTEM FOR SOLID POLYESTER GRANULE MANUFACTURE

(75) Inventors: Philip John Allan Ritchie, Balaclava (AU); Algirdas Kazimieras Serelis, Mount Waverley (AU); Bruce Leary, Port Melbourne (AU)

(73) Assignee: Orica Australia Pty Ltd, Melbourne (AU)

( * ) Notice: Subject to any disclaimer, the term of this patent is extended or adjusted under 35 U.S.C. 154(b) by 0 days.

(21) Appl. No.: 09/868,910

(22) PCT Filed: Jan. 20, 2000

(86) PCT No.: PCT/AU00/00029

§ 371 (c)(1), (2), (4) Date: Aug. 23, 2001

(87) PCT Pub. No.: WO00/43425

PCT Pub. Date: Jul. 27, 2000

(30) Foreign Application Priority Data

Jan. 20, 1999 (AU) .............................................. PP8264

(51) Int. Cl.[7] ........................ C09K 21/00; C08G 63/48; C08G 63/91
(52) U.S. Cl. ........................ 252/604; 252/610; 252/611; 525/7.1; 528/272; 560/98
(58) Field of Search ................................ 252/609, 610, 252/611; 525/7.1; 528/272; 560/98

(56) References Cited

U.S. PATENT DOCUMENTS 3,367,994 A    2/1968   Udvarnoki, Jr. et al.
5,196,457 A *  3/1993   Wilkinson et al.

FOREIGN PATENT DOCUMENTS

GB    1129861 A  *  1/1966
JP    56074112 A *  6/1981
WO    WO 97 35916 A  2/1997

OTHER PUBLICATIONS

Derwent WPAT Online Abstract No. 09116E/05 JP 56 166270 A (Nippon Shokubai Kagaku) Dec. 21, 1985.
Derwent WPAT Online Abstract No. 88–224322/32 JP 63 159466 A (Hitachi Chemical KK) Jul. 2, 1988.
Patent Abstracts of Japan, vol. 1997, No. 08, Aug. 29, 1997, & JP 09 110944 A (Mitsui Toatsu Chem Inc), Apr. 28, 1997.
Demmler et al., "cold curing of—" STN Chemical Abstracts, XX, XX, vol. 20, No. 81, Nov. 18, 1974, XP002035515.
Patent Abstracts of Japan, vol. 012, No. 433 (C–543), Nov. 15, 1988, & JP 63 159466 A (Hitachi Chem Co Ltd), Jul. 2, 1988.
Patent Abstracts of Japan, vol. 006, No. 054 (C–097), Apr. 9, 1982, & JP 56 166270 A (Nippon Shokubai Kagaku Kogyo Co Ltd), Dec. 21, 1981.

* cited by examiner

*Primary Examiner*—Brian Davis
(74) *Attorney, Agent, or Firm*—Bacon & Thomas

(57) ABSTRACT

The invention relates to the use of a diacyl peroxide in combination with an aromatic amine of formula (I) where $R^1$ is $C_1$–$C_{20}$ alkyl having at least one hydroxy substituent or —(CH'CHR'—O)$_n$H where n is 1 to 10 and each R' is independently selected from H and $C_1$–$C_3$ alkyl; $R^2$ is $C_1$–$C_{20}$ alkyl optionally substituted with one or more hydroxy groups, or —(CHR'CHR'—O)$_n$H where n=1 to 10; and each R is independently selected from H and $C_1$–$C_3$ alkyl; and Ar is an optionally substituted aryl group; as a redox initiating system in a process for the manufacture of polyester granules by suspension polymerisation. This invention also relates to a process for preparing solid polyester granules using such a redox initiating system.

34 Claims, No Drawings

INITIATING SYSTEM FOR SOLID POLYESTER GRANULE MANUFACTURE

This invention relates to the preparation of solid polyester granules of the type used as matting agents in paints. In particular the invention relates to a new redox initiating system for use in the suspension polymerisation process used to manufacture these solid polyester granules. This new initiating system provides advantages in terms of a reduction in odour in the resulting bead slurry due to more effective conversion of monomer into polymer, and production of less volatile and less toxic initiator residues than those produced using current initiating systems.

Solid polyester granules or beads are used as matting agents in paints, especially flat paints, to provide increased mar and burnish resistance. When included in flat paints they provide outstanding resistance to wet and dry abrasion. The granules are generally added to paint formulations in the form of a dispersion in an aqueous continuous phase. In some cases the polymer beads contain a pigment, such as titanium dioxide, and in other cases they are unpigmented. In view of the process used to manufacture these beads, the dispersion contains a significant amount of free or unreacted styrene.

Generally, the largest of these thermoset granules are approximately the thickness of a paint film in diameter. They protrude through the surface of the film and act as stationary ball bearings. Clothing, cleaning cloths and other objects that would normally mar the film only come into contact with the beads, and hence the paint film is very burnish resistant. This is in marked contrast to conventional flat paint films, where abrasion produces a large and unsightly localised increase in gloss.

In white and light tint paints, titanium dioxide containing solid beads are used in conjunction with external titanium dioxide to obtain the required opacity and tint strength. In dark or coloured tint bases, unpigmented beads are generally used. For these paints, opacity and tint strength are obtained from external pigmentation.

There are a number of problems with the current processes used to manufacture solid polyester granules. Solid polyester granules, such as solid SPINDRIFT® beads (Orica Australia Pty Ltd), are produced by emulsification in water and colloid stabilisers of an unsaturated polyester in styrene solution in which low levels of benzoyl peroxide and azobis(isobutyronitrile) have been incorporated. Emulsification is achieved through medium shear stirring and is carried out until the correct bead size has been obtained (typically 30–40 μm topsize). When that has been achieved, a low level of N,N-diethylaniline is added to the batch to complete the redox couple (with benzoyl peroxide) to initiate the suspension polymerisation. The azobis(isobutyronitrile) thermal initiator assists in the latter part of the exotherm to increase conversion. The batch may or may not be stirred during this stage, but stirring has traditionally been maintained to prevent any risk of settlement of the newly formed beads.

Solid beads have been made by this process for many years. However, in more recent times, significant safety, health and environment and raw material procurement issues became apparent, namely:

(a) Use of N,N-diethylaniline which is toxic and odorous. N,N-diethylaniline (DEA, CAS no. 91-66-7) is a liquid which can be absorbed through the skin resulting in surface irritation as well as causing methaemoglobinaemia with resulting anoxia and central nervous system depression. More significantly, these latter effects may arise if vapours are inhaled in significant amount ($LC_{50}$ rat=1920 mg/m$^3$/4 h). These hazards are significant in the case of DEA as it is a liquid. It is classified as a harmful/dangerous substance (class 6.1) under the Australian Code for the Transport of Dangerous Goods by Road and Rail.

(b) Use of azobis(isobutyronitrile) (AIBN) which cannot be transported at temperatures above 25° C. by law, cakes on storage and produces a toxic by-product (tetramethylsuccinonitrile CAS No. 3333-52-6) which persists in the beads.

(c) Higher than acceptable levels of free styrene by today's standards (1500 ppm or 0.15 wt-% for clear solid beads and 3000 ppm or 0.30 wt-% for pigmented solid beads) due to poor conversion.

A number of alternative less odorous/toxic initiating systems have been evaluated in the production of solid beads, however none have proved successful. Alternatives, while curing the polyester phase, have not been successful in maintaining stability during polymerisation, or of improving conversion levels, and spiking regimes partway through or just after the exotherm have also been investigated but without success.

It has now been found that the use of an initiating system comprising hydroxyl-containing aromatic amines and a diacyl peroxide can significantly reduce the odour and, on the available data, toxicity of the resultant bead slurry. Conversion of monomer into polymer is also improved. The use of this initiator system can also obviate the need for AIBN, although in some circumstances the presence of some AIBN may be advantageous.

Accordingly the invention provides the use of a diacyl peroxide in combination with an aromatic amine of formula (I):

where $R^1$ is $C_1$–$C_{20}$ alkyl having at least one hydroxy substituent or —(CHR'CHR'—O)$_n$H where n is 1 to 10 and each R' is independently selected from H and $C_1$–$C_3$ alkyl;

$R^2$ is $C_1$–$C_{20}$ alkyl optionally substituted with one or more hydroxy groups, or —(CHR'CHR'—O)$_n$H where n=1 to 10 and each R' is independently selected from H and $C_1$–$C_3$ alkyl; and Ar is an optionally substituted aryl group;

as a redox initiating system in a process for the manufacture of polyester granules by suspension polymerisation.

Preferably $R^1$ and $R^2$ are each linear $C_1$–$C_6$ alkyl groups having terminal hydroxy substituents. More preferably one or both of $R^1$ and $R^2$ are hydroxyethyl groups.

Preferably Ar is an optionally substituted phenyl group.

Preferably when $R^1$ or $R^2$ is —(CHR'CHR'O)$_n$H at least one R' on each —(CHR'CHR'O)— unit is hydrogen. More preferably both R' on each unit is hydrogen.

The optional substituents on the aryl group are preferably selected from electron donating groups. Examples of suitable electron donating groups include phenyl $C_1$–$C_6$ alkyl, or $C_1$–$C_6$ alkoxy. Preferably the phenyl group is substituted in the meta or para positions.

The presence of electron withdrawing groups interferes with the reactivity of the amine and accordingly they are not preferred.

Particularly preferred aromatic amines include N-ethyl-N-hydroxyethyl aniline, N,N-bis hydroxyethyl aniline, N-ethyl-N-hydroxyethyl-p-toluidine and N,N-bis hydroxyethyl-p-toluidine.

The diacyl peroxide may be selected from compounds of the formula II:

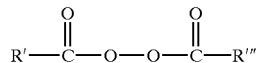

where R' and R" may be the same or different and may be optionally substituted alkyl, optionally substituted aryl, or optionally substituted alkoxy. Preferably the diacyl peroxide is (di)benzoyl peroxide.

The term "alkyl", used herein denotes straight chain, branched or cyclic alkyl, preferably $C_{1-20}$ alkyl or cycloalkyl. Examples of straight chain and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3,-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2-, or 3-propylhexyl, decyl, 1-, 2-, 3-, 4-, 5-, 6-, 7- and 8-methylnonyl, 1-, 2-, 3-, 4-, 5-, 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-, 2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like.

The term "alkoxy" denotes straight chain or branched alkoxy, preferably $C_{1-6}$ alkoxy. Examples of alkoxy include methoxy, ethoxy, n-propoxy, isopropoxy and the different butoxy isomers.

The term "aryl" as used herein refers to any moiety which includes or consists of one or more aromatic or pseudoaromatic rings. The rings may be carbocyclic or heterocyclic, and may be mono or polycyclic ring systems. Examples of suitable rings include but are not limited to benzene, biphenyl, terphenyl, quaterphenyl, naphthalene, anthracene, benzanthracene, dibenzanthracene, phenanthracene, perylene, pyridine, 4-phenylpyridine, 3-phenylpyridine, thiophene, benzothiophene, naphthothiophene, thianthrene, furan, pyrene, isobenzofuran, chromene, phenoxathiin, pyrrole, imidazole, pyrazole, pyrazine, pyrimidine, pyridazine, indole, indolizine, isoindole, purine, quinoline, isoquinoline, phthalazine, quinoxaline, quinazoline, pteridine, carbazole, carboline, phenanthridine, acridine, phenanthroline, phenazine, isothiazole, isooxazole, phenoxazine and the like, each of which may be optionally substituted. The terms "aromatic" and "aromatic compound(s)" include molecules, and macromolecules, such as polymers, copolymers and dendrimers which include or consist of one or more aromatic or pseudoaromatic rings. The term "pseudoaromatic" refers to a ring system which is not strictly aromatic, but which is stabilized by means of delocalization of π electrons and behaves in a similar manner to aromatic rings. Examples of pseudoaromatic rings include but are not limited to furan, thiophene, pyrrole and the like.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, isocyano, cyano, formyl, carboxyl, amino, alkylamino, dialkylamino, alkenylamino, alkynylamino, arylamino, diarylamino, benzylamino, imino, alkylimine, alkenylimine, alkynylimino, arylimino, benzylimino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphenyl, arylsulphenyl, carboalkoxy, carboaryloxy, alkylthio, benzylthio, acylthio, sulphonamido, sulfanyl, sulfo and phosphorus-containing groups, alkoxysilyl, silyl, alkylsilyl, alkylalkoxysilyl, phenoxysilyl, alkylphenoxysilyl, alkoxyphenoxy silyl and arylphenoxy silyl. Optional substituents should be non deleterious to the extent that they do not interfere with the emulsion polymerisation process.

Several aromatic amines according to the present invention are available from commercial sources. For example N,N-bis(2-hydroxyethyl)-p-toluidine (HET) is available from Morin Chemicals (Japan).

In contrast to DEA, HET (Cas no. 3077-12-1) which is a solid (mp about 45° C.) does not present a significant vapour inhalation hazard although inhalation of dust may result in respiratory irritation. Since the material is a waxy solid the issue of dust is very unlikely to arise. It is not defined as a dangerous substance under the Australian Transport Code mentioned above. Odour is also much lower and less offensive than that of DEA. By way of contrast N,N-dimethyl-p-toluidine (DMT, Cas no. 99-97-8), which does not contain hydroxy substitution, is a liquid with much of its toxicity comparable to DEA. It too is a class 6.1 toxic substance.

The dihydroxyamine, m-chlorophenyldiethanolamine (Cas no. 92-00-2) is also a low mp solid (mp=84° C.) and as such is a safer option than the use of DEA.

Those aromatic amines according to the invention not available from commercial sources can be prepared using analogous methods to those described in the literature for preparing the commercially available products. A person skilled in the art could readily be able to adapt the literature procedures. Those amines having polyoxyalkylene substituents on the nitrogen can be prepared by alkoxylating the corresponding hydroxyalkyl compound with an appropriate alkylene oxide.

In a further aspect of the present invention there is provided a process for the preparation of solid polyester granules comprising:

(i) preparing a solution of unsaturated polyester and diacyl peroxide in styrene, (ii) emulsifying said solution in water to provide a stabilised oil-in-water emulsion, (iii) adding to said emulsion an aromatic amine of formula (I):

(I)

where R¹ is $C_1$–$C_{20}$ alkyl having at least one hydroxy substituent, or —(CHR'CHR'—O)$_n$H where n is 1 to 10 and each R' is independently selected from H and $C_1$–$C_3$ alkyl;

R² is $C_1$–$C_{20}$ alkyl optionally substituted with one or more hydroxy groups, or —(CHR'CHR'—O)$_n$H where n is 1 to 10 and each R' is independently selected from H or $C_1$–$C_3$ alkyl; and Ar is an optionally substituted aryl group;

such that reaction of said aromatic amine of formula (I) and said diacyl peroxide produces free radicals capable of initiating copolymerisation of said unsaturated polyester and said styrene.

The first step in this process involves the preparation of a solution of unsaturated polyester and diacyl peroxide in styrene. The unsaturated polyester may be any suitable commercially available unsaturated polyester, such as Polylite 31-001 (Reichhold Chemicals Inc, USA), or the unsaturated polyester may be prepared using conventional techniques. Unsaturated polyesters can be broadly described as the reaction products of difunctional carboxylic acids and alcohols which contain double bonds within the polymer backbone. The double bonds may come from the alcohol components or from the carboxylic acid component. The saturated polyesters useful according to the present invention are generally terpolymers of the following three components:

(I) unsaturated aliphatic polycarboxylic acid/anhydride, such as fiunaric acid, maleic acid anhydride or the like, (ii) aromatic polycarboxylic acid such as phthalic anhydride, isophthalic acid or the like, and (iii) polyol, such as propylene glycol, neopentyl glycol or the like.

These components are reacted to form a basically linear polyester chain via a condensation polymerisation process. Since the final step in preparing a polyester (the curing step) involves an addition or chain polymerisation reaction with styrene, many commercial suppliers of unsaturated polyester provide it in the form of a solution in styrene. Preferably the polyester is a terpolymer of maleic anhydride, phthalic anhydride and propylene glycol.

The solution of unsaturated polyester and diacyl peroxide in styrene may be prepared in a number of ways. The diacyl peroxide may be added directly to a prepared solution of unsaturated polyester in styrene, or it may be pre-dissolved in styrene, with warming and/or mixing if necessary before being added to the unsaturated polyester solution. Further styrene may be added to give the desired concentration.

In the case of pigmented polyester beads, the pigment, such as $TiO_2$, may be dispersed by high speed agitation in styrene or a styrene/polyester blend. This dispersion can then be diluted with further styrene or styrenelpolyester blend. The diacyl peroxide may be separately dissolved in styrene as described above before being combined with the mixture of polyester, styrene and pigment.

Other additives conventional to the art may also be added to the organic solution. For example AIBN may also be added. In the case of AIBN, this is conveniently added with the diacyl peroxide to styrene or a styrene/polyester mix and stirred to form a solution. Other additives could include a surfactant, e.g. sodium dihexylsulphosuccinate. The solution of unsaturated polyester and diacyl peroxide in styrene will generally have the following composition:

|  | wt % |
| --- | --- |
| Styrene | 5–40 |
| Unsaturated polyester* | 40–95 |
| diacyl peroxide | 1–5 |
| $TiO_2$ | 0–45 |
| other additives | 0–2 |

*65% NV in styrene

The next step in the process is the preparation of an oil-in-water emulsion. This emulsion may be prepared by adding the above organic solution to an aqueous solution containing suitable stabilisers and/or surfactants.

Preferably the emulsion is formed in an insulated vessel such that the polymerisation or curing is performed under adiabatic conditions. The aqueous phase acts as a heat sink to prevent an excessive temperature rise during the reaction. On a commercial scale it is convenient to pump the polyester/styrene/diacyl peroxide solution into an insulated vessel containing a solution of colloid stabilisers in water. This produces droplets of oil phase in water.

The droplets are initially large, but agitation, such as by stirring, can reduce the droplet size to the desired level. At this stage the average droplet size is usually reduced to 5 µm to 100 µm, more usually 10 µm to 25 µm with a top size of 20 µm to 50 µm, most usually about 20 µm with a topsize of about 40 µm.

After the desired particle size is achieved it is necessary to cure the polymer. Most of the aromatic amines useful in the present invention are solids. This is in contrast with DEA which is a liquid. Accordingly it is convenient to dissolve the aromatic amine in a paint compatible solvent prior to addition to the oil-in-water emulsion. Preferably the paint compatible solvent is a water miscible solvent such as an alcohol, for example ethanol, ethylene glycol or propylene glycol. Most preferably the solvent is propylene glycol, although the particular solvent used will depend on the solubility characteristics of the aromatic amine and the particular paint product to which the beads are to be added.

It has been found that several of the aromatic amines useful according to the present invention act as bead coalescents. Accordingly it is desirable to add the amines in such a way as to avoid pockets of the amine forming in the oil-in-water emulsion.

This can be achieved by adding the amine as a relatively dilute solution in the selected solvent. Preferably the concentration of the amine is less than 15%, more preferably below 10% and most preferably between 5% and 10% by weight.

It is also preferred that the amine solution is added to the oil-in-water emulsion as a spray or as a series of thin streams, such as through a spray nozzle, into regions of high turbulence or movement. It is also preferred that the rate of stirring of the oil-in-water emulsion is increased during the addition of the amine. Since stirring decreases the particle size it is important to find the correct balance between minimising particle size reduction and maximising distribution of the amine.

In order to maintain stability of the emulsion during the exotherm, it is preferred that stirring ceases after dispersion of the amine in the emulsion. Following the exotherm, i.e. when there is no further temperature rise, stirring may be restarted. This can be important to prevent settlement.

Redox "spikes" may be added at chosen times after initiation of the polymerisation if desired. An example of such a spike is ferrous sulphate solution and sodium erythorbate solution.

The redox initiator system according to the present invention may provide a short cure time, with a shorter induction period and a steeper exotherm, than is achieved using DEA.

After polymerisation is substantially complete the bead slurry may be transferred to a curing tank where the slurry may be stirred until the reaction is complete. For example in an industrial process this may be done overnight.

The beads may then be sized by passing the slurry through an appropriate filter, such as a vibrating filter, and then, if necessary, a thickener may be added.

The polyester beads prepared according to the process of the present invention have reduced odour and toxicity relative to those produced by conventional processes. Similarly paints prepared using the polyester beads of the present invention have reduced odour and toxicity. The reduction in odour and toxicity is partly due to improved conversion of the styrene, and partly due to the production of less volatile and less toxic initiator residues. The process avoids the use of DEA, which is toxic and volatile, and can be performed without AIBN. The lower odour and toxicity makes the beads according to the present invention, and the paints prepared from them, more pleasant to use, and, by avoiding the use of DEA, there is an improvement in safety and occupational health in the production plants.

Without wishing to be limited by theory it is believed that the curing of the solid beads using the present initiating system proceeds via the following scheme.

The mechanism of radical formation and subsequent initiation is believed to involve (I) an initial $S_N2$ attack by the amine to cleave the peroxide linkage and expel a benzoate anion (2), forming a benzoyloxyammonium cation (1) (Pryor, 1993) which then (ii) undergoes homolysis to an aminium radical cation (3) and benzoyloxy radical (4) (Walling, 1957). The benzoyloxy radical can then initiate polymerisation.

(iii) The aminium radical cation (3) can lose a proton, most likely via abstraction by the benzoate anion (2) to generate an aminoalkyl radical (5) which can also initiate polymerization (Sato, 1969, 1971 & 1975).

Alternative pathways are available for the decomposition or further reaction of the benzoyloxyammonium cation (1), the aminium radical cation (3), and the benzoyloxy (4) and aminoalkyl (5) radicals, and it is the existence of these competing pathways which is responsible for the low initiation efficiencies inherent in polymerizations initiated by amine/peroxide couples (Walling, 1957).

In particular, when all three groups R are alkyl, the benzoyloxyammonium cation (1) decomposes exclusively through non-radical pathways and polymerization does not occur (Bartlett, 1947). The reason for this is that at least one group R must be aryl to provide sufficient activation of the N—O bond in the benzoyloxyammonium cation (1) to permit homolysis to occur at a rate comparable to those of the competing non-radical reactions. Furthermore, the aryl substituent must be one which can achieve the spatial orientation necessary to provide such activation (Huisgen, 1965).

Substituents on the aromatic ring of a dialkyl arylamine, depending on their position and electronic character, affect the rates of steps (i) and (ii) in the manner usually associated with ionic reactions at α-aryl centres. For example, an electron donating methyl group produces a 10-fold rate increase if placed in the para position, and a weaker 6-fold rate increase in the meta position, while an electron withdrawing meta chloro substituent causes a 3-fold rate decrease. It is expected that other substituents will also behave in this classically predictable fashion: electron donating substituents will accelerate the reaction (relative to hydrogen) while electron withdrawing substituents will retard it, regardless of their position on the ring (ortho, meta, or para) (Walling, 1957).

The rate effects are most obviously manifest as changes in induction times, and also in the time required to reach peak exotherm. Thus, on purely practical grounds electron donating substituents are preferred because they lead to shorter curing times whereas electron withdrawing substituents cause longer curing times.

While it may be expected that increased rates of initiation and the consequent higher radical flux might improve conversion, there is in fact no clear correlation between the two. This is most likely because substituents on the aromatic ring may also promote or retard various side reactions of the amine or the aminium radical cation (3) with the initiating and polymerizing radicals and thereby counteract the beneficial effect of higher rates of initiator radical generation. These side reactions of (3) may occur at the N-alkyl groups by abstraction of a hydrogen atom leading ultimately to loss of one alkyl group (Walling, 1957: Sato, 1969), at the aromatic ring, leading to the introduction of further substituents (Walling, 1957; Srinivas, 1989), or, in some cases, at the ring substituent itself. Improved conversions are consistently seen in the case of ring-substituted N,N-bis(2-hydroxyethyl)anilines, and this appears to ensue from the N-hydroxyalkyl groups and ring substituents suppressing side reactions. These side reactions terminate chains, divert intermediates, or consume initiating radicals non-productively.

The most significant of the above-mentioned side reactions from the viewpoint of volatile byproducts is the hydrogen atom abstraction (iv) from the radical cation (3) by either benzoyloxy or some other radical. The inimium cation (6) formed initially will hydrolyze (v) to a secondary amine (7) and an aldehyde, although alternative non-dealkylative pathways and products are possible for some substituted N-alkyl groups, including the 2-hydroxyethyl group. N,N-Diethylaniline will thus give rise to volatile and toxic N-ethylaniline and acetaldehyde. However, in contrast the byproducts from N,N-bis(2-hydroxyethyl)-p-toluidine will be the dealkylation product N-(2-hydroxyethyl)-p-toluidine and hydroxyacetaldehyde, although the latter compound would be of transient stability and would self-react to produce a non volatile product. Furthermore, the dealkylation product, in contrast to N-ethylaniline, is of much lower volatility and toxicity.

SCHEME

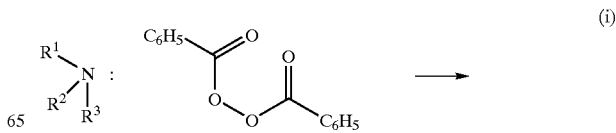

(i)

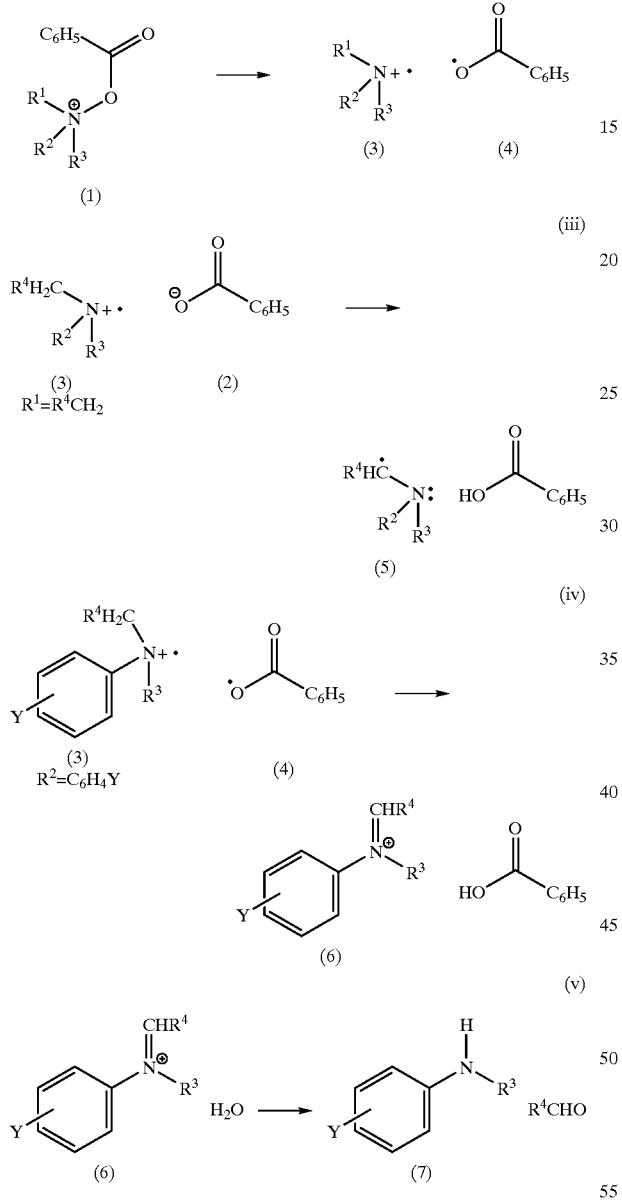

The invention will now be described with reference to the following examples which illustrate some preferred embodiments of the present invention, together with some comparative examples. However it is to be understood that the particularity of the following description of the invention is not to supersede the generality of the invention hereinbefore described.

EXAMPLES

Example 1—Comparative

This comparative example, based on the use of N,N-diethylaniline, is typical of the results obtained using conventional processes for making pigmented solid polyester granules (beads).

A 1 kg sample of pigmented solid bead slurry was made using the process outlined below. The cured beads with encapsulated titanium dioxide had a topsize of about 40 µm (mean size about 20 µm). The free styrene level in the bead slurry (approx 49 wt. % solids in this example) was 5200 ppm.

| Stage | Material | Wt. |
|---|---|---|
| A | Unsaturated polyester solution[1] (65% NV in styrene monomer) | 56.47 |
|   | Styrene | 22.92 |
|   | Titanium dioxide (Tiona RCL575, ex Millenium Inorganic Chemicals) | 180.42 |
| B | Unsaturated polyester solution | 64.05 |
| C | Styrene | 19.48 |
|   | Azobis(isobutyronitrile) | 1.24 |
|   | Benzoyl peroxide (75% paste in water) | 7.03 |
|   | Unsaturated polyester solution | 138.74 |
| D | Water | 328.34 |
|   | 7.5% polyvinylalcohol solution[2] | 41.13 |
|   | 1.5% hydroxyethyl cellulose solution[3] | 132.97 |
|   | Aerosol MA-80[4] | 6.05 |
| E | N,N-diethylaniline | 1.16 |
|   |   | 1000.00 |

Notes:
[1] Terpolymer of propylene glycol/maleic anhydride/phthalic anhydride.
[2] Solution of 88% hydrolysed polyvinyl alcohol (eg Poval 224 ex Kurary or Airvol 540 ex Air Products).
[3] Natrosol 250HR (ex Aqualon).
[4] Sodium dihexyl sulphosuccinate surfactant (ex Cytec).

Procedure

1. The titanium dioxide was dispersed by high speed mixing in the polyester/styrene blend (stage A), followed by letting down (stage B). This was carried out in a 500 mL open top round can.
2. Stage C was prepared by first gently warming and mixing the styrene with the azobis(isobutyronitrile) and the benzoyl peroxide in a derimmed 250 mL can. When the peroxide and azo initiator were fully dissolved, the polyester solution and Aerosol MA-80 were added. The solution was then added to stages A&B while stirring.
3. During steps 1–2, stage D was placed in a 1L round can. The temperature of the water was chosen such that when stages A–C were added the mixture as a whole would be at a temperature of 40±2° C.
4. Stages A–C were then added to stage D under stirring to form an oil-in-water emulsion. Stirring was continued until the desired emulsion droplet size was achieved (topsize 40 µm, average size about 20 µm –1.5 min of stirring at 1000 rpm). Stirring speed was then decreased.
5. The N,N-diethylaniline was then added to allow suspension polymerisation to proceed. The can was surrounded by a thermal insulant to minimise heat losses. The induction time in this make-up was 20 min while the peak exotherm of 76° C. was reached after 40 minutes.

Example 2

In contrast to example 1, a slurry of pigmented solid polyester granules with improved odour and lower free styrene was produced using the process described below.

The beads in the 1 kg sample of slurry had a topsize of about 40 μm (mean size about 20 μm). The free styrene in the bead slurry (which was approx 49 wt. % solids) was 2600 ppm (50% less than that seen in example 1) and the slurry had a lower and more pleasant odour. The stirring time in this make up to achieve the desired emulsion droplet size was 4.5 min (at 1000 rpm). The induction time was 2 min while the peak exotherm of 76° C. was reached after 11 minutes.

In order to avoid bead coalescence early in the polymerisation a 10% solution of HET in propylene glycol and water was added over about 30 seconds in a thin stream while stirring at about 500 rpm. The stirrer was then turned off for the period of the exotherm to avoid bead aggregation. In contrast when a more concentrated solution of HET (25%) was used, bead recoalescence occurred which led to a fraction of unwanted large beads being formed.

| Stage | Material | Wt. |
|---|---|---|
| A | Unsaturated polyester solution (65% NV in styrene monomer) | 55.54 |
|  | Styrene | 22.54 |
|  | Titanium dioxide (Kerr-McGee Tronox CR-828) | 177.25 |
| B | Unsaturated polyester solution | 64.04 |
| C | Styrene | 19.63 |
|  | Benzoyl peroxide (75% paste in water) | 13.82 |
|  | Unsaturated polyester solution | 136.45 |
|  | Aerosol MA-80 | 1.44 |
| D | Water | 322.36 |
|  | 7.5% poly(vinyl alcohol) solution | 40.47 |
|  | 1.5% hydroxyethyl cellulose solution | 130.80 |
| E | 10% HET solution[1] | 15.66 |
|  |  | 1000.00 |

Notes: [1]. Composition: 10% bis(hydroxyethyl)-p-toluidine(HET), 30% propylene glycol, 60% water. In preparing this solution the HET was first dissolved in propylene glycol by warming to 50° C. and hand stirring with a spatula followed by addition of the water.

Example 3

The procedure used here was identical to that used in Example 2 except that a mixture of dilauroyl peroxide and benzoyl peroxide was used in conjunction with HET. The quantities used are shown below. The free styrene level was 2000 ppm (about 60% less than that seen in Example 1).

| Stage | Material | Wt. |
|---|---|---|
| A | Unsaturated polyester solution (65% NV) | 56.19 |
|  | Styrene | 22.80 |
|  | Titanium dioxide (Tioxide RHD2) | 179.51 |
| B | Unsaturated polyester solution | 201.76 |
| C | Styrene | 19.38 |
|  | Dilauroyl peroxide | 7.00 |
|  | Benzoyl peroxide (75% paste) | 3.50 |
| D | Water | 326.68 |
|  | 7.5% poly(vinyl alcohol) solution | 40.92 |
|  | 1.5% hydroxyethyl cellulose solution | 132.30 |
|  | Aerosol MA-80 | 6.02 |
| E | 40% HET solution (in propylene glycol) | 3.94 |
|  |  | 1000.00 |

Example 4

The procedure used here was broadly similar to that used in Example 2 except:
azobis(isobutyronitrile), a thermal initiator, was incorporated into the organic phase as well as t-butyl perbenzoate sodium erythorbate solution and iron sulphate solution were added as a spike (15 min after initiation) to improve conversion.

The free styrene level was found to be 1400 ppm (about 70% less than that seen in Example 1). Staging is shown below.

| Stage | Material | Wt. |
|---|---|---|
| A | Unsaturated polyester solution (65% NV) | 54.16 |
|  | Styrene | 21.98 |
|  | Titanium dioxide (Tioxide RHD2) | 173.04 |
| B | Unsaturated polyester solution | 194.49 |
| C | Styrene | 18.68 |
|  | Azobis(isobutyronitrile) | 1.19 |
|  | Benzoyl peroxide (75%) | 6.75 |
|  | t-Butyl perbenzoate | 2.25 |
| D | Water | 314.92 |
|  | 7.5% poly(vinyl alcohol) solution | 39.45 |
|  | 1.5% hydroxyethyl cellulose solution | 127.53 |
|  | Aerosol MA-80 | 5.80 |
| E | 40% HET (in propylene glycol) | 1.45 |
| F | Ferrous sulphate solution (2% approx) | 3.37 |
|  | Sodium erythorbate solution (3.5%) | 34.94 |
|  |  | 1000.00 |

Example 5—Comparative

This comparative example, based on the use of N,N-diethylaniline, is typical of the results achieved using conventional processes for making clear solid polyester granules (beads).

A 1 kg sample of clear solid bead slurry was made using the process outlined below. The cured beads had a topsize of about 30 μm (mean size about 15 μm). The free styrene level in the bead slurry approx 39 wt. % solids in this example) was 6700 ppm.

| Stage | Material | Wt. |
|---|---|---|
| A | Styrene | 73.68 |
|  | Azobis(isobutyronitrile) | 2.05 |
|  | Benzoyl peroxide (75%) | 9.96 |
| B | Unsaturated polyester solution (65% NV) | 374.51 |
| C | Water | 341.56 |
|  | 7.5% poly(vinyl alcohol) solution | 69.85 |
|  | 1.5% hydroxyethyl cellulose solution | 126.15 |
| D | N,N-diethylaniline | 2.24 |
|  |  | 1000.00 |

Procedure

1. Stage A was prepared by first gently warming and mixing the styrene, azobis(isobutyronitrile) and the benzoyl peroxide in a derimmed 500 mL can until the peroxide and azo initiator were fully dissolved. The polyester (stage 3) was then added and the solution was set aside.
2. Stage C was prepared in a 1L round can. The temperature of the water was chosen such that when stages A–B are added the mixture as a whole would be at 30±2° C.
3. Stages A–B were then added to stage C under stirring to form an oil-in-water emulsion. Stirring was continued until the desired emulsion droplet size was achieved (topsize 30 μm, average size about 15 μm—about 5 min of stirring). Stirring speed was then decreased.

4. The N,N-diethylaniline was then added to allow suspension polymerisation to proceed. The can was surrounded by a thermal insulant to minimise heat losses. The induction time was 18 min while the peak exotherm of 80° C. was reached after 32 minutes.

Example 6

In contrast to Example 5, a slurry of clear solid polyester granules with improved odour and lower free styrene was produced using the process described below. The beads in the 1 kg sample were of a similar size to those produced in Example 5. Time required to achieve this size was similar to that in Example 5 (5 min) while the induction time was 6 min with a peak exotherm of 83° C.

The free styrene level was found to be 2600 ppm (about 60% less than that seen in Example 5). In addition the slurry had a lower and more pleasant odour. As with Example 2 the HET was added as a 10% solution in propylene glycol and water over about 30 seconds in a thin stream while stirring at 500 rpm. The stirrer was turned off for the period of the exotherm in order to avoid bead aggregation.

| Stage | Material | Wt. |
| --- | --- | --- |
| A | Styrene | 73.16 |
|   | Benzoyl peroxide (75%) | 12.73 |
| B | Unsaturated polyester solution (65% NV) | 371.83 |
| C | Water | 327.05 |
|   | 7.5% poly(vinyl alcohol) solution | 69.34 |
|   | 1.5% hydroxyethyl cellulose solution | 125.25 |
| D | 10% HET solution | 20.64 |
|   |   | 1000.00 |

Example 7

The procedure used here was essentially the same as that used in Example 6 except:
 azobis(isobutyronitrile) was incorporated into the organic phase, and
 a 30% solution of m-chlorophenyldiethanolamine (in propylene glycol) was used to initiate the polymerisation.

The free styrene level was found to be 4500 ppm (about 30% less than that seen in Example 5). Process staging is shown below.

| Stage | Material | Wt. |
| --- | --- | --- |
| A | Styrene | 73.03 |
|   | Benzoyl peroxide (75%) | 9.96 |
|   | Azobis(isobutyronitrile) | 2.03 |
| B | Unsaturated polyester solution (65% NV) | 371.09 |
| C | Water | 338.43 |
|   | 7.5% poly(vinyl alcohol) solution | 69.21 |
|   | 1.5% hydroxyethyl cellulose solution | 125.03 |
| D | 30% m-chlorophenydiethanolamine solution (in propylene glycol) | 11.22 |
|   |   | 1000.00 |

REFERENCES

Bartlett, P. D. & Nozaki, K. (1947). The Decomposition of Benzoyl Peroxide in Solvents. II Ethers, Alcohols, Phenols and Amines. J. Amer. Chem. Soc. 69, pp2299–2303.

Huisgen, R. & Kolbeck, W. (1965). N-Acyloxy-Ammonium-Salze. Tetrahedron Letters no 12, pp783–787.

Pryor, W. A. & Hendrickson, W. H. (1993). The Mechanism of Radical Production from the Reaction of N,N-Dimethylaniline with Benzoyl Peroxide. Tetrahedron Letters 24, no 14, pp459–1462.

Sato, T. & Otsu, T. (1969). Vinyl Polymerisation Initiated with Dimethylaniline N-Oxide and Metal Salts. Makromol. Chem. 125, 1–14.

Sato, T. Takada, M. & Otsu, T. (1971). Vinyl Polymerisation with Dimethylaniline/Cupric Nitrate System. Makromol. Chem. 148, pp239–249.

Sato, T., Kita, S. & Otsu, T. (1975). A Study on Initiation of Vinyl Polymerisation with Diacyl Peroxide-Tertiary Amine Systems by Spin Trapping Technique. Makromol. Chem. 176, pp561–571.

Srinivas, S. & Taylor , K. G. (1989). Amine Induced Reactions of Diacyl Peroxides. J. Org. Chem. 55, pp1779–1786.

Walling, C. (1957). Free Radicals in Solution, pp590–595. New York: John Wiley & Sons Inc.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A process for the preparation of solid polyester granules comprising:
   (i) preparing a solution of unsaturated polyester and diacyl peroxide in styrene;
   (ii) emulsifying said solution in water to provide a stabilised oil-in-water emulsion;
   (iii) adding to said emulsion an aromatic amine of formula (I):

where $R^1$ is $C_1$–$C_{20}$ alkyl having at least one hydroxy substituent, or —$(CHR'CHR'—O)_n$H where n is 1 to 10 and each R' is independently selected from H and $C_1$–$C_3$ alkyl;
   $R^2$ is $C_1$–$C_{20}$ alkyl optionally substituted with one or more hydroxy groups, or —$(CHR'CHR'—O)_n$H where n is 1 to 10 and each R' is independently selected from H or $C_1$–$C_3$ alkyl; and
   Ar is an optionally substituted aryl group;
   whereby reaction of said aromatic amine of formula (I) and said diacyl peroxide produces free radicals which initiate an exothermic copolymerisation of said unsaturated polyester and said styrene.

2. A process according to claim 1 wherein the unsaturated polyester comprises a terpolymer of maleic anhydride, phthalic anhydride and propylene glycol.

3. A process according to claim 1 wherein a pigment is included in said solution of unsaturated polyester and diacyl peroxide in styrene.

4. A process according to claim 1 wherein AIBN is included in said solution of unsaturated polyester and diacyl peroxide in styrene.

5. A process according to claim 1 wherein the solution of unsaturated polyester and diacyl peroxide in styrene has the following composition:

|  | wt% |
| --- | --- |
| Styrene | 5–40 |
| Unsaturated polyester* | 40–95 |
| diacyl peroxide | 1–5 |
| TiO$_2$ | 0–45 |
| other additives | 0–2 | where the wt % of unsaturated polyester is expressed on the basis that it is 65% NV in styrene.

6. A process according to claim 1 wherein the stabilised oil in water emulsion is prepared by adding the solution of unsaturated polyester and diacyl peroxide in styrene to an aqueous solution containing stabiliser and/or surfactant.

7. A process according to claim 1 wherein the aromatic amine is dissolved in a solvent prior to addition of the oil-in-water emulsion, said solvent having properties making it suitable for subsequent inclusion in a paint.

8. A process according to claim 7 wherein the paint compatible solvent is a water miscible solvent.

9. A process according to claim 8 wherein the water miscible solvent is an alcohol.

10. A process according to claim 9 wherein the alcohol is selected from ethanol, ethylene glycol and propylene glycol.

11. A process according to claim 7 wherein the amine solution has an amine concentration of less than 15% by weight.

12. A process according to claim 7 wherein the amine solution has an amine concentration of less than 10% by weight.

13. A process according to claim 7 wherein the amine solution has an amine concentration of between 5% and 10% by weight.

14. A process according to claim 7 wherein the emulsion is agitated while the amine solution is added.

15. A process according to claim 14 wherein the amine solution is added as a spray or as a series of thin streams into regions within the emulsion of high turbulence or movement.

16. A process according to claim 14 wherein stirring is ceased after dispersion of the amine in the emulsion.

17. A process according to claim 16 wherein stirring is commenced following the exotherm.

18. Solid polyester granules prepared in accordance with the method of claim 11.

19. A process according to claim 11 wherein the emulsion is agitated while the amine solution is added.

20. A process according to claim 1 wherein $R^1$ is $C_1$–$C_{20}$ alkyl having at least one hydroxy substituent and $R^2$ is $C_1$–$C_{20}$ alkyl optionally substituted with one or more hydroxy groups.

21. A process according to claim 20 wherein $R^1$ is a linear $C_1$–$C_6$ alkyl group having a terminal hydroxy group.

22. A process according to claim 20 wherein $R^1$ is a linear $C_1$–$C_6$ alkyl group which is not substituted with one or more hydroxy groups.

23. A process according to claim 1 wherein one or both of $R^1$ and $R^2$ are hydroxyethyl groups.

24. A process according to claim 1 wherein Ar is an optionally substituted phenyl group.

25. A process according to claim 1 wherein at least one of $R^1$ and $R^2$ is —(CHR'CHR'O)$_n$H where n is 1 to 10 and at least one R' on each —(CHR'CHR'O)— unit is hydrogen.

26. A process according to claim 25 wherein both R' on each —(CHR'CHR'O)— unit are hydrogen.

27. A process according to claim 24 wherein Ar is a phenyl group substituted with at least one electron donating group.

28. A process according to claim 24 wherein the at least one electron donating group is selected from phenyl, $C_1$–$C_6$ alkyl and $C_1$–$C_6$ alkoxy.

29. A process according to claim 27 wherein the phenyl group is mono-substituted with an electron donating group in the meta or para position.

30. A process according to claim 1 wherein the aromatic amine of formula I is selected from N-ethyl-N-hydroxyethyl aniline, N,N-bis hydroxyethyl aniline, N-ethyl-N-hydroxyethyl-p-toluidine and N,N-bis hydroxyethyl-p-toluidine.

31. A process according to claim 30 wherein the diacyl peroxide is selected from compounds of the formula II:

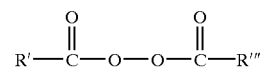

II where R' and R" may be the same or different and may be optionally substituted alkyl, optionally substituted aryl, or optionally substituted alkoxy.

32. A process according to claim 1 wherein the diacyl peroxide is selected from compounds of formula II:

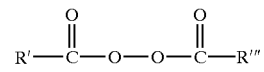

II where R' and R" independently selected from optionally substituted alkyl, optionally substituted aryl and optionally substituted alkoxy.

33. A process according to claim 1 wherein the diacyl peroxide is (di)benzoyl peroxide.

34. A process according to claim 21 wherein $R^1$ is a linear $C_1$–$C_6$ alkyl group which is not substituted with one or more hydroxy groups.

* * * * *